(12) United States Patent
Bou Nader (10) Patent No.: US 12,104,494 B2
(45) Date of Patent: Oct. 1, 2024

(54) TURBINE ENGINE DEVICE WITH POWER SYSTEM GENERATOR, AND VEHICLE COMPRISING SUCH A DEVICE

(71) Applicant: PSA AUTOMOBILES SA, Poissy (FR)

(72) Inventor: Wissam Bou Nader, Palaiseau (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 18/546,911

(22) PCT Filed: Jan. 5, 2022

(86) PCT No.: PCT/FR2022/050024
§ 371 (c)(1),
(2) Date: Aug. 17, 2023

(87) PCT Pub. No.: WO2022/180311
PCT Pub. Date: Sep. 1, 2022

(65) Prior Publication Data
US 2024/0141801 A1  May 2, 2024

(30) Foreign Application Priority Data
Feb. 26, 2021  (FR) ...................................... 2101906

(51) Int. Cl.
*F01D 15/10*  (2006.01)
*B60K 3/04*  (2006.01)
(Continued)

(52) U.S. Cl.
CPC ............... *F01D 15/10* (2013.01); *B60K 3/04* (2013.01); *B60K 6/24* (2013.01); *F01D 15/02* (2013.01);
(Continued)

(58) Field of Classification Search
CPC  F01D 15/10; F01D 15/02; B60K 3/04; B60K 6/24; F02C 3/36; F02C 6/18;
(Continued)

(56) References Cited

U.S. PATENT DOCUMENTS 8,499,874 B2 *  8/2013  Dewis ...................... B60K 6/12
                                                  180/65.265
8,669,670 B2 *  3/2014  Donnelly .................. F02C 6/18
                                                      60/39.15

(Continued)

FOREIGN PATENT DOCUMENTS

DE          854605 C      11/1952
FR          3107558 A1     8/2021

OTHER PUBLICATIONS

International Search Report to PCT/FR2022/050024 mailed May 11, 2022.
Written Opinion to PCT/FR2022/050024 mailed May 11, 2022.

*Primary Examiner* — Jesse S Bogue
(74) *Attorney, Agent, or Firm* — Sandberg Phoenix & von Gontard P.C.

(57) ABSTRACT

The invention relates to a turbine engine device of the gas turbine cycle type with cooled compression, regeneration, and reheating during expansion. The turbine engine device comprises a first turbocharger (C1, T2), a second turbocharger (C2, T1), two combustion chambers (CC1, CC2), an intercooler (IC), and a heat exchanger (E1). The device is configured to implement a fluid flow from the first compressor (C1) to the intercooler (IC), to the second compressor (C2), to the heat exchanger (E1), to the first combustion chamber (CC1), to the second turbine (T1) or the first turbine, to the second combustion chamber (CC2), to the first turbine (T2) or the second turbine, According to one aspect, the turbochargers are mounted on separate axes (A1, A2).

8 Claims, 6 Drawing Sheets

(51) Int. Cl.
- *B60K 6/24* (2007.10)
- *F01D 15/02* (2006.01)
- *F02C 3/36* (2006.01)
- *F02C 6/18* (2006.01)
- *F02C 6/20* (2006.01)
- *F02C 7/08* (2006.01)
- *F02C 7/143* (2006.01)

(52) U.S. Cl.
CPC ............... *F02C 3/36* (2013.01); *F02C 6/18* (2013.01); *F02C 6/20* (2013.01); *F02C 7/08* (2013.01); *F02C 7/143* (2013.01); *F05D 2220/32* (2013.01); *F05D 2220/40* (2013.01); *F05D 2220/74* (2013.01); *F05D 2220/76* (2013.01)

(58) Field of Classification Search
CPC .... F02C 6/20; F02C 7/08; F02C 7/143; F05D 2220/32; F05D 2220/40; F05D 2220/74; F05D 2220/76

See application file for complete search history.

(56) References Cited

U.S. PATENT DOCUMENTS

| | | | | |
|---|---|---|---|---|
| 9,624,829 | B2* | 4/2017 | Lebel | F02C 9/54 |
| 10,119,460 | B2* | 11/2018 | Primus | F02B 63/04 |
| 11,391,209 | B2* | 7/2022 | Razak | F01D 25/10 |
| 2002/0152754 | A1* | 10/2002 | MacKay | F02C 7/10 |
| | | | | 60/39.511 |
| 2012/0000204 | A1* | 1/2012 | Kesseli | F02C 3/107 |
| | | | | 60/778 |
| 2012/0285166 | A1* | 11/2012 | Zahdeh | F02B 37/166 |
| | | | | 60/605.1 |

* cited by examiner

TURBINE ENGINE DEVICE WITH POWER SYSTEM GENERATOR, AND VEHICLE COMPRISING SUCH A DEVICE

CROSS-REFERENCE TO RELATED APPLICATIONS

This application is the US National Stage under 35 USC § 371 of International Application No. PCT/FR2022/050024, filed Jan. 5, 2022, which claims the priority of the French application No. 2101906 filed on Feb. 26, 2021, the content (text, drawings and claims) of both said applications being incorporated by reference herein.

BACKGROUND

The devices described herein relate to the field of devices and systems of turbine engines of the gas turbine cycle type with cooled compression, regeneration, and reheating during expansion (IRReGT). This type of turbine engine generally comprises turbines and compressors associated with combustion chambers with heat recovery. The devices described relate in particular to applications that are useful for motor vehicles.

The turbogenerator cycle with an intercooler, a recuperator and a heat exchanger of the IRReGT type ("Intercooled Regenerative Reheat Gas Turbine") is a high potential cycle. This cycle makes it possible to achieve a very high efficiency but also a very high power density (high specific net work).

The IRReGT cycle, although interesting in terms of specific efficiency and net work, has a major drawback, the need for two compressors to be able to carry out a cooled compression and two turbines to be able to carry out an expansion with intermediate reheating.

This adds drawbacks of integration complexity due to the length of the common axis; with a problem of control of the optimal speed since each turbomachine (compressor or turbine) operates at an optimal speed specific thereto; vibration, balancing, special machining due to the long axis of the turbochargers, further involving compliance with an integration in which the turbomachines are on the same axis.

SUMMARY

Thus, an objective is to provide an integrated architecture which allows the aforementioned problems to be solved.

To achieve this objective, a turbine engine device for a motor vehicle is related, the device comprising
  a first turbocharger comprising a first compressor, a first turbine and a first electric generator;
  a second turbocharger comprising a second compressor, a second turbine and a second electric generator;
  two combustion chambers;
  an intercooler connected to the first compressor and to the second compressor;
  a heat exchanger connected to the second compressor and to a first combustion chamber, itself connected to the first turbine, the second combustion chamber being connected to the two turbines;
the device being configured to implement a flow of fluid from the first compressor to the intercooler, to the second compressor, to the heat exchanger, to the first combustion chamber, to the first turbine, to the second combustion chamber, to the second turbine, wherein the turbochargers are mounted on separate axes.

Advantageously, the arrangement of the device makes it possible to have an architecture that can be easily integrated by separating the two turbochargers without requiring a long common axis with a common direction of rotation.

According to other aspects considered separately, or combined according to all technically feasible combinations:
  the device is arranged in a hot portion comprising high-temperature elements, and a cold portion separated from the hot portion, comprising low-temperature elements; and/or
  the two axes are substantially contiguous, the first axis including the first turbine outside, the first compressor inside, the second axis including the second turbine and the second compressor inside; and/or
  the intercooler is arranged on a front or rear side of the two axes, and the combustion chambers are arranged on another rear or front side of the two axes; and/or
  the electric generators are arranged at the same outer or inner end of the axes; and/or
  the device includes two substantially parallel axes, the first axis including the first turbine, the first compressor on one side, the second axis including the second turbine and the second compressor on the other side in a mirrored arrangement; and/or
  the intercooler and the combustion chambers are arranged between the axes.

Also related is a power supply system for a motor vehicle comprising a turbine engine device connected to a power unit configured to be connected to the motor vehicle.

Another object is a motor vehicle comprising a turbine engine device.

BRIEF DESCRIPTION OF THE FIGURES

The described devices will be further detailed by the description of non-limiting embodiments, and based on the appended figures illustrating variants, wherein.

DETAILED DESCRIPTION

The described devices relate to a turbine engine device of the type with gas turbine cycle with cooled compression, regenerator, and reheat during expansion (IRReGT). The described devices relate in particular to applications that are useful for motor vehicles.

The turbine engine device comprises a first turbocharger and a second turbocharger.

The first turbocharger comprises a first compressor C1 and a first turbine T2.

The second turbocharger comprises a second compressor C2 and a second turbine T1.

In particular, they consist of radial-type turbine engines (compressors and turbines). On this type of machine, the working fluid, air in the case of the compressor and gas in the case of the turbine, have a radial path between the inlet and the outlet.

The turbochargers are preferably electrified, i.e. each comprises an electric generator G1, G2. In the preferred variant, it consists of an electric machine operating both in motor and generator mode, i.e., motor to drive and start the system; and generator to recover the energy. The reference r refers to bearings.

The turbine engine device further comprises two combustion chambers CC1 and CC2, and an intercooler IC.

The intercooler IC is connected to the first compressor C1 and to the second compressor C2.

The turbine engine device further comprises a heat exchanger E1. The heat exchanger E1 is connected to the second compressor C2 and to a first combustion chamber CC1.

The first combustion chamber CC1 is further connected to the second turbine T1 in a first embodiment, or to the first turbine T2 in a second embodiment.

The second combustion chamber CC2 is connected to the two turbines T1, T2.

The device is configured to implement a fluid flow F1 from the first compressor C1 to the intercooler IC. Afterwards, the flow F1 passes from the intercooler IC to the second compressor C2. Afterwards, the flow F1 passes from the second compressor C2 to the heat exchanger E1. Afterwards, the flow F1 passes from the heat exchanger E1 to the first combustion chamber CC1. Afterwards, the flow F1 passes from the first combustion chamber CC1 to the second turbine T1 in the first embodiment or to the first turbine T2 in the second embodiment. Afterwards, the flow F1 passes to the second combustion chamber CC2, then to the first turbine T2 in the first embodiment or to the second turbine T1 in the second embodiment.

According to one aspect, the turbochargers are mounted on separate axes A1, A2.

Advantageously, the arrangement of the device makes it possible to have an architecture that can be easily integrated by separating the two turbochargers without requiring having a long common axis with a common direction of rotation. Having two turbochargers each on its axis, instead of only one, allows the length of the axis to be reduced and to have more flexibility with regards to the operating points as well as to integration.

Compared to the known solutions, the described devices allow the complexity of a turbogenerator device using an IRReGT-type thermodynamic cycle to be reduced. Indeed, having two axes also makes it possible to have more freedom on the positioning of the components; to reduce the number of elbows; to bring the components close to each other, moving the hot components (such as the heat exchanger E1, the combustion chambers CC1, CC2, the turbines T1, T2) away from the cold components (such as the compressors C1, C2, the intercooler IC, as well as the electric machines).

This therefore makes it possible to reduce the complexity of the device, reduce the manufacturing constraints of the system, reduce the total mass of the machine and minimize the total volume.

All these advantages are beneficial for optimizing a turbogenerator designed to be integrated into a motor vehicle drivetrain.

In particular, the first turbocharger forms a "low pressure—lp" stage, and the second turbocharger forms a "high pressure—hp" stage.

According to the desired variant, the second compressor C2 may also be coupled (HP compressor) to the first turbine T2 (LP turbine) according to the balance of the powers.

According to one variant, the electric generators G1, G2 are on each of said axes.

According to one variant, the two axes A1, A2 are substantially contiguous, i.e., one next to the other or coaxial to be in a substantially parallel or oblique direction.

In the contiguous or coaxial configuration, the first axis A1 includes the first turbine T2 outside, i.e. in a first outer position; and the first compressor C1 inside, i.e. in a first inner position. Furthermore, the second axis A2 includes the second turbine T1 outside, i.e. in a second outer position, and the second compressor C2 inside, i.e. in a second inner position. This variant may be illustrated by FIGS. 2 and 3. As seen, in this configuration, the first and second axes are arranged one next to the other so as to be substantially coaxial with each other. Advantageously, this makes it possible to have components on either side of the axes and implement a symmetrical structure. For example, the electric generators G1, G2 may be arranged between the two axes A1, A2, in particular with the turbochargers at the outer ends; or vice versa.

Figure 1:
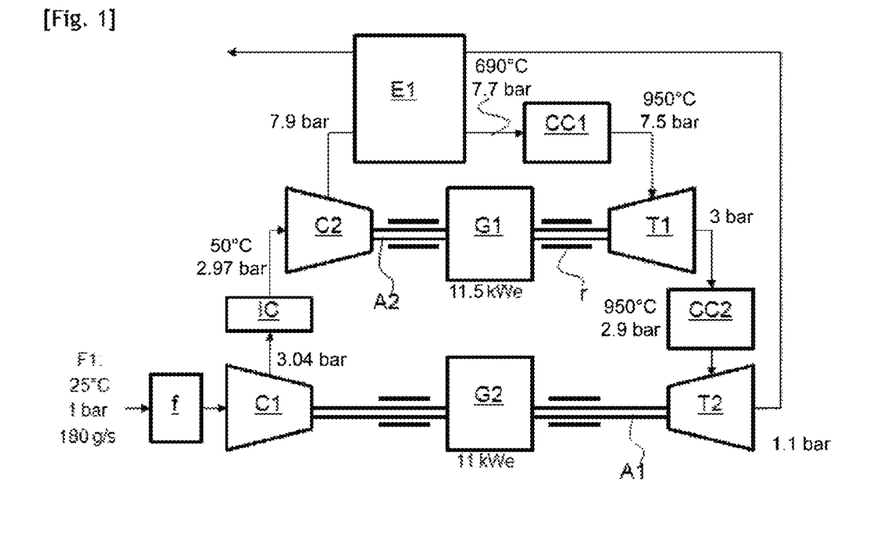
FIG. 1 illustrates a block diagram of a turbine engine device according to a first embodiment.
Figure 2:
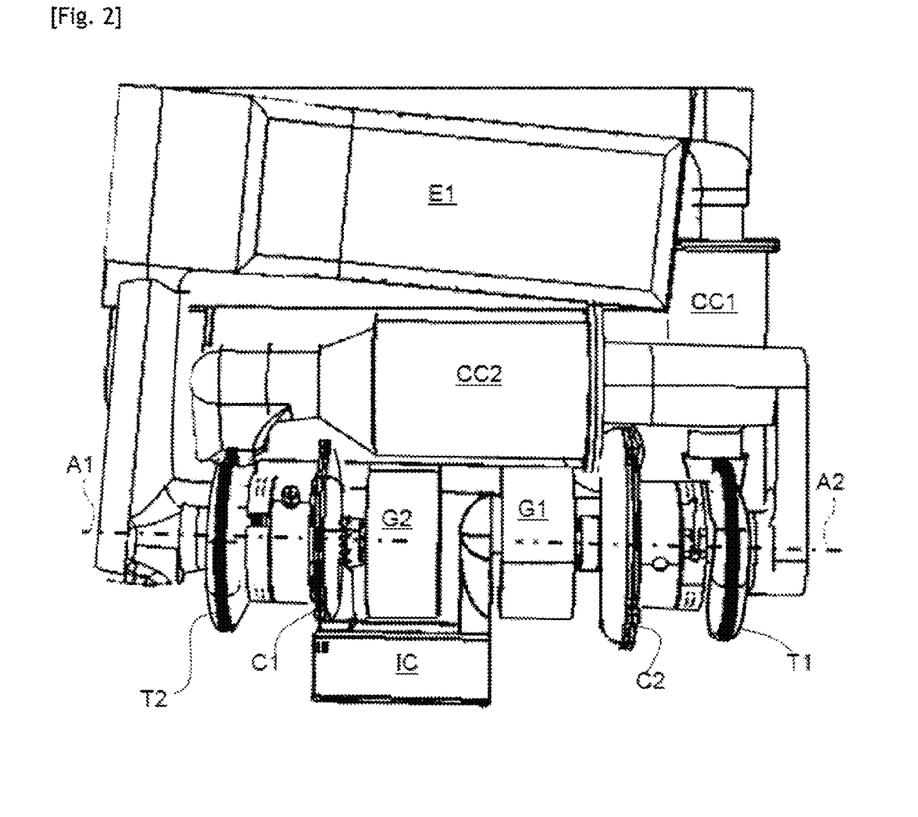
FIG. 2 schematically illustrates a top view of a turbine engine device according to the first embodiment.
Figure 3:
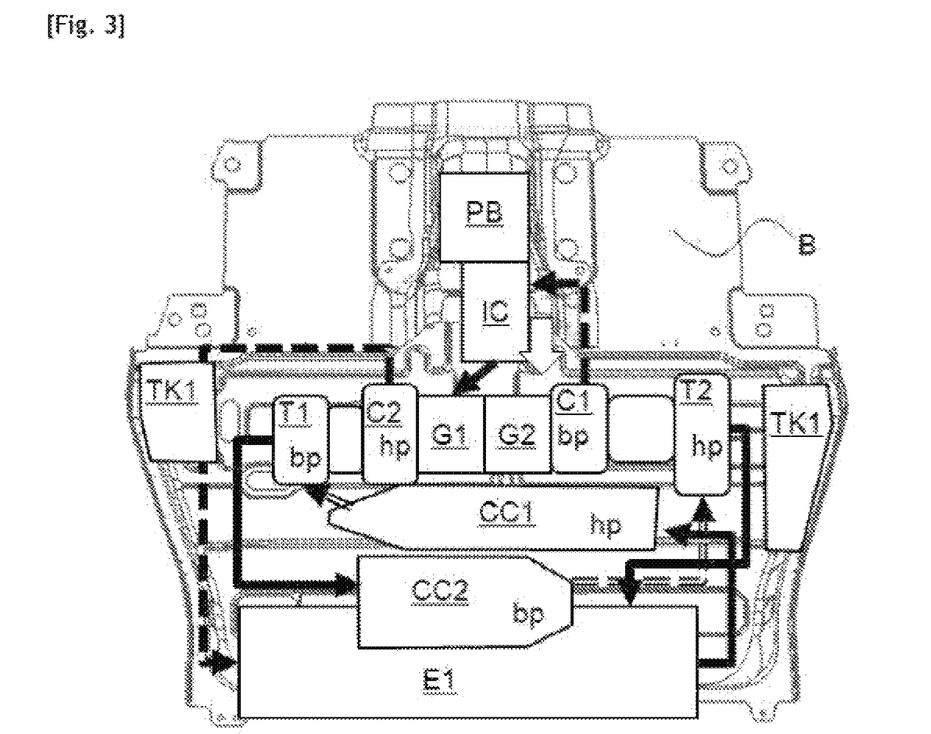
FIG. 3 schematically illustrates a first arrangement of a turbine engine device according to the first embodiment in a power supply system for a motor vehicle.

The exchanger E1 or recuperator being the longest part, covers the entire length of a case B at the rear. This thus allows the center of gravity of the system to be centered.

According to one variant, the turbine engine device is arranged in separate portions of different temperatures, in particular a hot portion comprising high-temperature elements, and a cold portion separated from the hot portion, comprising low-temperature elements.

Preferably, the intercooler IC is arranged on a front or rear side of the two axes A1, A2, and the combustion chambers CC1, CC2 are arranged on another rear or front side of the two axes A1, A2, in particular in the variant with the contiguous axes A1, A2. This variant may be illustrated by FIGS. 2 (front downwards); and 3, 5, 6 (front upwards).

Advantageously, this makes it possible to align the turbochargers transversely by positioning the compressors C1, C2 inside. The intercooler IC may be positioned between the compressors C1, C2. Thus, the cold components are arranged at the middle.

On both outer ends of the turbochargers are positioned the turbines, and behind, the combustion chambers CC1, CC2 and the recuperator or heat exchanger E1. Thus, the hot components are at the rear.

By selecting this architecture, this makes it possible to place heat shields between the cold area and the hot area (cold components and hot components). This architecture makes it possible to integrate the assembly into a reduced functional volume.

According to one variant, the turbine engine device includes two substantially parallel axes A1, A2, for example on two right and left sides. In this configuration, the first axis A1 includes the first turbine T2, the first compressor C1 on one side, and the second axis A2 includes the second turbine T1 and the second compressor C2 on the other side, preferably in a mirrored arrangement. This variant may be illustrated by FIG. 4. Advantageously, this makes it possible to provide turbine engines on either side of the case B.

Figure 4:
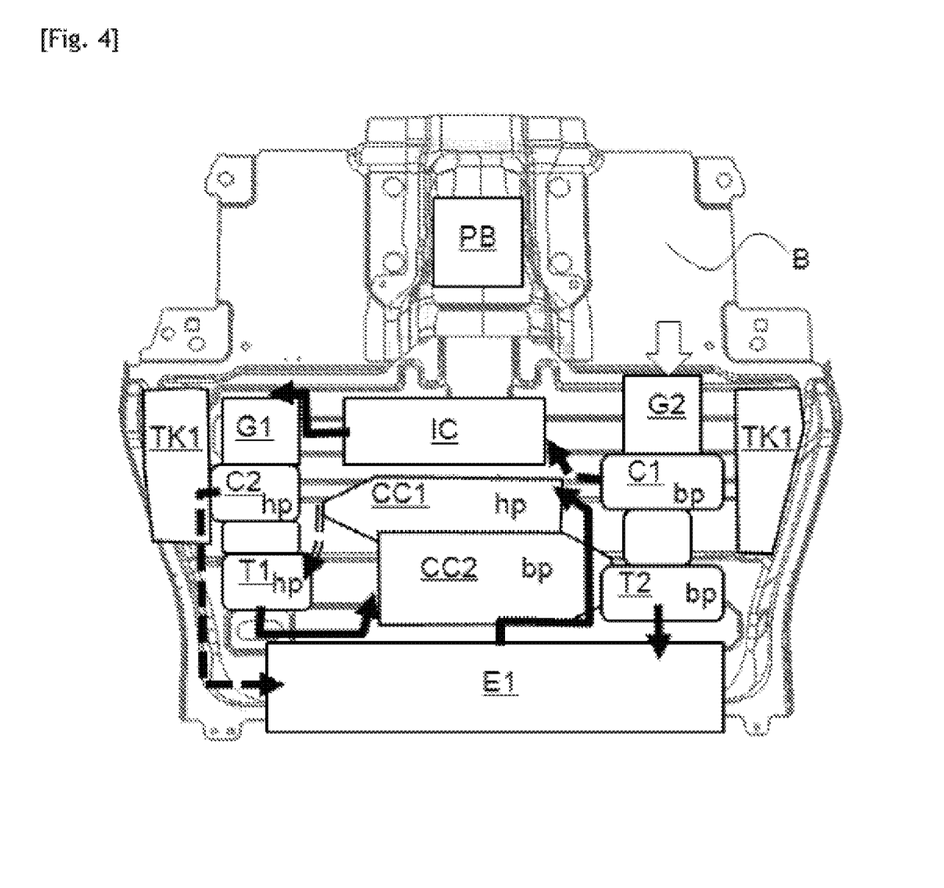
FIG. 4 schematically illustrates a second arrangement of a turbine engine device according to the first embodiment in a power supply system for a motor vehicle.
Figure 5:
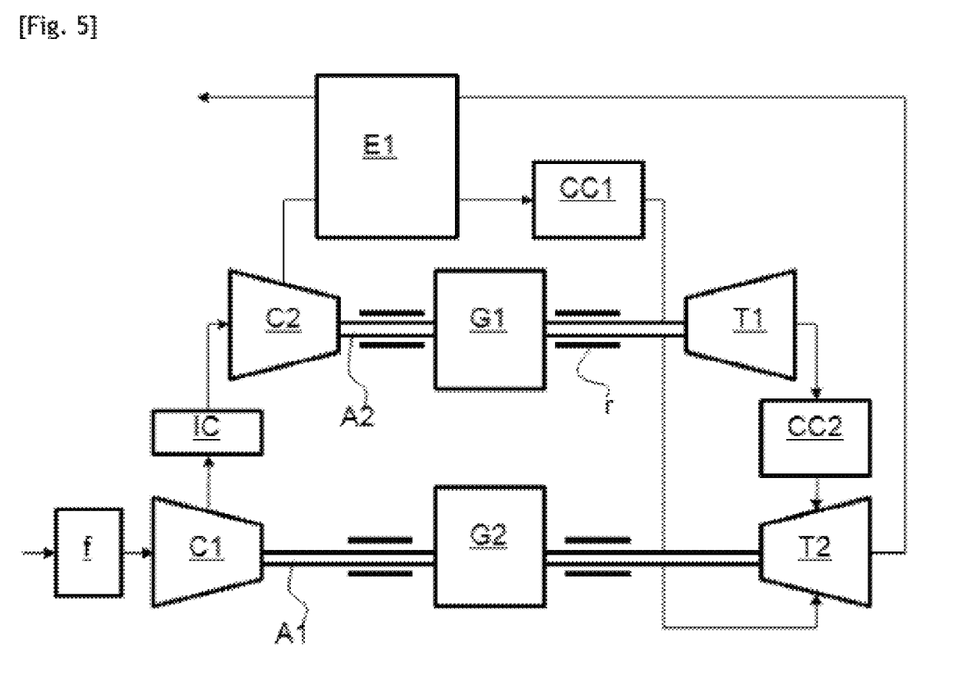
FIG. 5 illustrates a block diagram of a turbine engine device according to a second embodiment.
Figure 6:
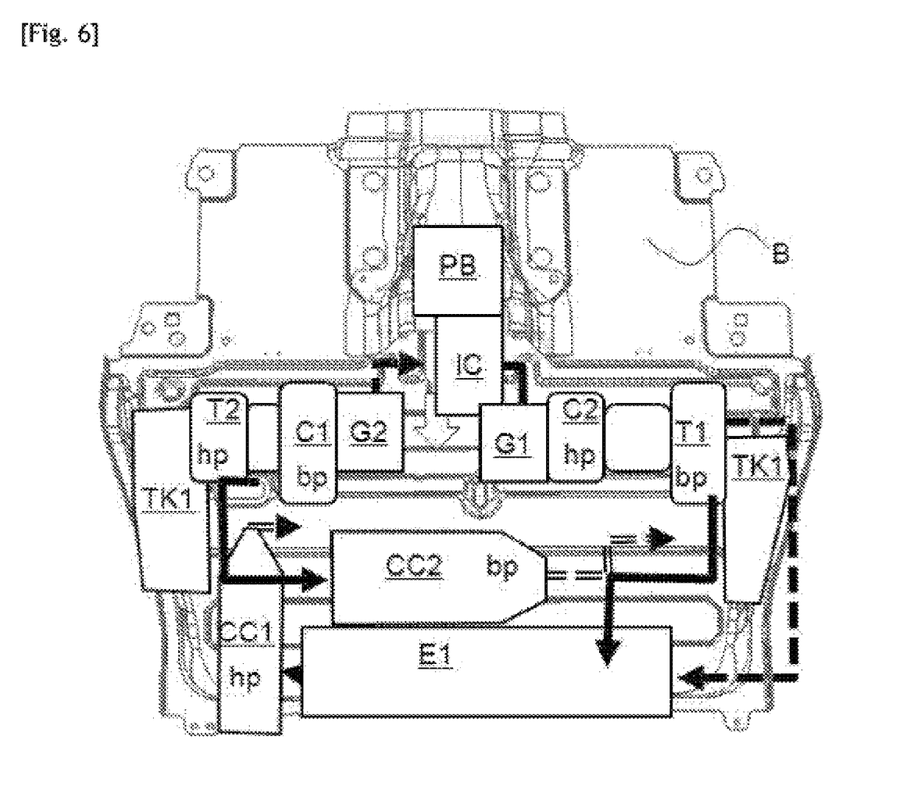
FIG. 6 schematically illustrates a first arrangement of a turbine engine device according to the second embodiment in a power supply system for a motor vehicle.
Figure 7:
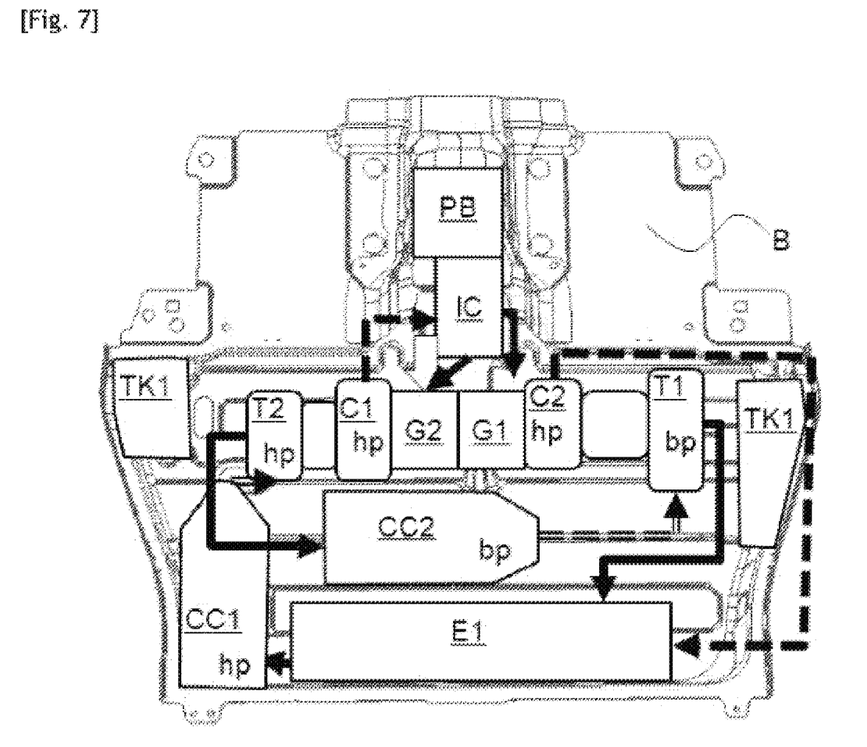
FIG. 7 schematically illustrates a second arrangement of a turbine engine device according to the second embodiment in a power supply system for a motor vehicle.

Preferably, the intercooler IC and the combustion chambers CC1, CC2 are arranged between the axes A1, A2. This makes it possible to define the cold and hot areas differently.

The described devices further relate to a power supply system of a motor vehicle comprising a turbine engine device as described above. The device is connected to a power unit PB configured to be connected to the motor vehicle.

Indeed, the device may be integrated into a casing B of the battery pack type for an electric vehicle. This would make it possible to replace some kWh battery capacity by a turbo-generator system based on the turbine engine device.

The power supply system may also be used as a range extender.

Another object relates to a motor vehicle comprising a turbine engine device as described above. In particular, a vehicle with an electric traction motor preferably of the hybrid type. The reference signs TK relate to fuel tanks.

The invention claimed is:

1. A turbine engine device for a motor vehicle, the device comprising
    a first turbocharger comprising a first compressor, a first turbine and a first electric generator;
    a second turbocharger comprising a second compressor, a second turbine and a second electric generator;
    a first combustion chamber and a second combustion chamber;
    an intercooler connected to both the first compressor and to the second compressor;
    a heat exchanger connected to the second compressor and to the first combustion chamber, the first combustion chamber being connected to the second turbine or to the first turbine, the second combustion chamber being connected to both turbines;
    the turbine engine device being configured to implement a fluid flow from the first compressor to the intercooler, to the second compressor, to the heat exchanger, to the first combustion chamber, to one of the second turbine or the first turbine, to the second combustion chamber, to the other of the first turbine or the second turbine,
    wherein the first and second turbochargers are mounted on two separate axes,
    wherein the two separate axes comprise a first axis and a second axis which are contiguous and arranged one next to the other so as to be substantially coaxial with each other, the first axis including the first turbine in a first outer position and the first compressor in a first inner position, the second axis including the second turbine in a second outer position and the second compressor in a second inner position.

2. The turbine engine device according to claim 1, the turbine engine device having a first portion comprising high-temperature elements, and a second portion separated from the first portion, comprising low-temperature elements.

3. The turbine engine device according to claim 1, wherein the intercooler and the combustion chambers are arranged such that:
    the intercooler is on a front side of the two axes, and the combustion chambers are arranged on a rear side of the two axes, or
    the intercooler is arranged on a rear side of the two axes, and the combustion chambers are arranged on a front side of the two axes.

4. The turbine engine device according to claim 1, wherein the first electric generator and the second electric generator are arranged between the first turbocharger and the second turbocharger, or the first turbocharger and the second turbocharger are arranged between the first electric generator and the second electric generator.

5. The turbine engine device according to claim 1, wherein the intercooler and the combustion chambers are arranged between the axes.

6. A power supply system for a motor vehicle comprising a turbine engine device according to claim 1 connected to a power unit configured to be connected to the motor vehicle.

7. A motor vehicle comprising a turbine engine device according to claim 1.

8. The turbine engine device according to claim 1 wherein the first turbine and the first compressor of the first axis and the second turbine and the second compressor of the second axis are in a mirrored arrangement.

* * * * *